US009573122B2

(12) United States Patent
Xie et al.

(10) Patent No.: US 9,573,122 B2
(45) Date of Patent: Feb. 21, 2017

(54) SMALL CRYSTAL LTL FRAMEWORK TYPE ZEOLITES

(71) Applicants: Dan Xie, Richmond, CA (US); Stacey Ian Zones, San Francisco, CA (US); Robert James Saxton, San Rafael, CA (US)

(72) Inventors: Dan Xie, Richmond, CA (US); Stacey Ian Zones, San Francisco, CA (US); Robert James Saxton, San Rafael, CA (US)

(73) Assignee: Chevron U.S.A. Inc., San Ramon, CA (US)

(*) Notice: Subject to any disclaimer, the term of this patent is extended or adjusted under 35 U.S.C. 154(b) by 387 days.

(21) Appl. No.: 14/505,308

(22) Filed: Oct. 2, 2014

(65) Prior Publication Data

US 2016/0059225 A1    Mar. 3, 2016

Related U.S. Application Data

(60) Provisional application No. 62/043,689, filed on Aug. 29, 2014.

(51) Int. Cl.
*C01B 39/32* (2006.01)
*B01J 29/60* (2006.01)
*B01J 35/02* (2006.01)
*B01J 37/03* (2006.01)
*B01J 37/04* (2006.01)
(Continued)

(52) U.S. Cl.
CPC ............... *B01J 29/60* (2013.01); *B01J 35/023* (2013.01); *B01J 37/038* (2013.01); *B01J 37/04* (2013.01); *B01J 37/10* (2013.01); *C01B 39/026* (2013.01); *C01B 39/32* (2013.01); *C01B 39/46* (2013.01); *B01J 2229/10* (2013.01); *B01J 2229/38* (2013.01); *C01P 2004/32* (2013.01);
(Continued)

(58) Field of Classification Search
CPC ... C01B 39/32; C01P 2004/32; C01P 2004/38; C01P 2004/62; B01J 39/60
See application file for complete search history.

(56) References Cited

U.S. PATENT DOCUMENTS 3,216,789 A   11/1965   Breck et al.
3,298,780 A    1/1967   Fleck
(Continued)

FOREIGN PATENT DOCUMENTS

EP      428506     5/1991
GB     1202511     8/1970

OTHER PUBLICATIONS

P.W. Tamm, D.H. Mohr and D.R. Wilson "Octane Enhancement by Selective Reforming of Light Paraffins" Stud. Surf. Sci. Catal. 1988, 38, 335-353.
(Continued)

*Primary Examiner* — David M Brunsman
(74) *Attorney, Agent, or Firm* — Terrence M. Flaherty

(57) ABSTRACT

Small crystal LTL framework type zeolites, characterized as polycrystalline aggregates, each of the aggregates comprising a plurality of spherical or cube-like crystallites and wherein each crystallite has an average crystallite size of from 10 to 50 nm, are disclosed. Such zeolites can be prepared by hydrothermal conversion of FAU framework type zeolites at low $H_2O/SiO_2$ mole ratios.

15 Claims, 2 Drawing Sheets

(51) Int. Cl.
  *B01J 37/10* (2006.01)
  *C01B 39/02* (2006.01)
  *C01B 39/46* (2006.01)

(52) U.S. Cl.
  CPC ...... *C01P 2004/38* (2013.01); *C01P 2004/45* (2013.01); *C01P 2004/62* (2013.01)

(56) References Cited

U.S. PATENT DOCUMENTS

| | | | |
|---|---|---|---|
| 3,867,512 A | 2/1975 | Young | |
| 4,018,890 A * | 4/1977 | Moller | C07D 231/20 514/404 |
| 4,544,539 A | 10/1985 | Wortel | |
| 4,657,749 A | 4/1987 | Vaughan | |
| 4,701,315 A | 10/1987 | Wortel | |
| 4,894,214 A | 1/1990 | Verduijn et al. | |
| 4,956,166 A | 9/1990 | Verduijn | |
| 5,017,353 A | 5/1991 | Verduijn | |
| 5,051,387 A | 9/1991 | Koetsier et al. | |
| 5,064,630 A | 11/1991 | Verduijn et al. | |
| 5,242,675 A | 9/1993 | Verduijn | |
| 5,318,766 A | 6/1994 | Vaughan et al. | |
| 5,330,736 A | 7/1994 | Wu et al. | |
| 5,486,348 A * | 1/1996 | Verduijn | B01J 29/60 423/700 |
| 5,491,119 A | 2/1996 | Verduijn | |
| 5,624,656 A * | 4/1997 | Verduijn | B01J 29/60 423/700 |
| 5,670,130 A | 9/1997 | Verduijn | |
| 2013/0245349 A1 | 9/2013 | Larlus et al. | |
| 2014/0010754 A1 | 1/2014 | Davis | |

OTHER PUBLICATIONS

O. Larlus and V.P. Valtchev "Crystal Morphology Control of LTL-Type Zeolite Crystals" Chem. Mater. 2004, 16, 3381-3389.

A.Z. Ruiz, D. Bruhwiler, T. Ban and G. Calzaferri "Synthesis of Zeolite L. Tuning Size and Morphology" Monatsh. Chem. 2005, 136, 77-89.

T. Ban, H. Saito, M. Naito, Y. Ohya and Y. Takahashi "Synthesis of zeolite L crystals with different shapes" J. Porous Mater. 2007, 14, 119-126.

R. Brent, A.J.W. Lobo, D.W. Lewis and M.W. Anderson "Modifying the Crystal Habit of Zeolite L by Addition of an Organic Space Filler" J. Phys. Chem. C 2010, 114, 18240-18246.

A.I. Lupulescu, M. Kumar and J.D. Rimer "A Facile Strategy to Design Zeolite L Crystals with Tunable Morphology and Surface Architecture" J. Am. Chem. Soc. 2013, 135, 6608-6617.

K. Honda, M. Itakura, Y. Matsuura, A. Onda, Y. Ide, M. Sadakane and T. Sano "Role of Structural Similarity Between Starting Zeolite and Product Zeolite in the Interzeolite Conversion Process" J. Nanosci. Nanotechnol. 2013, 13, 3020-3026.

T. Sano, M. Itakura and M. Sadakane "High Potential of Interzeolite Conversion Method for Zeolite Synthesis" J. Jpn. Petrol. Inst. 2013, 56, 183-197.

PCT International Search Report, PCT/US2015/017965, mailed Jun. 3, 2015.

K. Honda, M. Itakura, Y. Matsuura, A. Onda, Y. Ide, M. Sadakane and T. Sano "Role of Structural Similarity Between Starting Zeolite and Product Zeolite in the Interzeolite Conversion Process" J. Nanosci. Nantechnol. 2013, 13, 3020-3026.

* cited by examiner

SMALL CRYSTAL LTL FRAMEWORK TYPE ZEOLITES

TECHNICAL FIELD

This disclosure relates generally to LTL framework type zeolites, characterized as polycrystalline aggregates, each of the aggregates comprising a plurality of spherical or cube-like crystallites and wherein each crystallite has an average crystallite size of from 10 to 50 nm, and methods for making the same.

BACKGROUND

Molecular sieves are a commercially important class of crystalline materials having distinct crystal structures with ordered pore structures and characteristic X-ray diffraction patterns. Natural and synthetic crystalline molecular sieves are useful as catalysts and adsorbents.

Molecular sieves are classified by the Structure Commission of the International Zeolite Association (IZA) according to the rules of the IUPAC Commission on Zeolite Nomenclature. According to this classification, framework type zeolites and other crystalline microporous molecular sieves, for which a structure has been established, are assigned a three letter code and are described in the "*Atlas of Zeolite Framework Types*," Sixth Revised Edition, Elsevier, 2007.

One known molecular sieve for which a structure has been established is the material designated as LTL. LTL framework type materials have a framework comprising cancrinite-type cages linked by double six rings in columns and cross-linked by single oxygen bridges to form 12-membered ring pore channels. Examples of LTL framework type molecular sieves include Linde Type L (zeolite L) and LZ-212. LTL framework type materials are of significant commercial interest because of their activity as catalysts in hydrocarbon conversion reactions, particularly aromatization reactions (see, e.g., P. W. Tamm et al., *Stud. Surf. Sci. Catal.*, 1988, 38, 335-353).

Zeolite L is disclosed in U.S. Pat. No. 3,216,789 and is described as having the following composition in terms of moles of oxides:

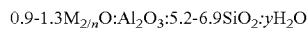

0.9-1.3M$_{2/n}$O:Al$_2$O$_3$:5.2-6.9SiO$_2$:yH$_2$O where M is an exchangeable cation of valence n and y is from 0 to 9.

Methods for preparing zeolite L in the absence of an organic structure directing agent from a synthesis mixture containing sources of alkali metal ions, an oxide of silicon, an oxide of aluminum, and water are known. See, for example, U.S. Pat. Nos. 3,216,789; 3,867,512; 4,544,539; 4,657,749; 4,701,315; 4,894,214; 4,956,166; 5,017,353; 5,051,387; 5,064,630; 5,242,675; 5,318,766; 5,330,736; 5,491,119; and 5,670,130; U.S. Patent Application Publication No. 2013/0245349; and Great Britain Patent No. 1,202,511.

K. Honda et al. (*J. Nanosci. Nanotechnol.* 2013, 13, 3020-3026) disclose the preparation of a LTL framework type zeolite in the absence of an organic structure directing agent by the hydrothermal conversion of a FAU framework type zeolite having a Si/Al mole ratio of 25 at 125° C.

Conventional synthesis of LTL framework type zeolites yield cylindrical crystals with one-dimensional channels oriented along the c-axis length of the cylinder. Researchers have used various surfactants or so-called "molecular modifiers" to prepare LTL framework type zeolites with tunable morphology (see, e.g., A. I. Lupulescu, et al., *J. Am. Chem. Soc.* 2013, 135, 6608-6617).

It is known that crystal morphology, size and aggregation/agglomerization can affect catalyst behavior, especially regarding catalyst activity and stability. To improve mass transportation rates, zeolite crystals with small size can be desirable, e.g., for reducing diffusion limitations.

There is, therefore, a need for novel crystalline LTL framework type zeolite compositions and methods of making such compositions, especially zeolites of small crystal size and non-cylindrical morphology.

SUMMARY

In one aspect, there is provided a method for preparing an LTL framework type zeolite, characterized as polycrystalline aggregates, each of the aggregates comprising a plurality of spherical or cube-like crystallites and wherein each crystallite has an average crystallite size of from 10 to 50 nm, the method comprising: (a) preparing a reaction mixture comprising: (1) a FAU framework type zeolite; (2) hydroxide ions; (3) a source of alkali metal (M); and (4) water; wherein the reaction mixture comprises, in terms of mole ratios, the following:

| | |
|---|---|
| SiO$_2$/Al$_2$O$_3$ | 5 to 60 |
| M/SiO$_2$ | 0.15 to 0.50 |
| OH/SiO$_2$ | 0.15 to 0.50 |
| H$_2$O/SiO$_2$ | 3 to 12 | where M is potassium or a mixture of potassium and one or more other alkali metals; and (b) subjecting the reaction mixture to crystallization conditions sufficient to form crystals of the LTL framework type zeolite.

In another aspect, there is provided an LTL framework type zeolite, characterized as polycrystalline aggregates, each of the aggregates comprising a plurality of spherical or cube-like crystallites and wherein each crystallite has an average crystallite size of from 10 to 50 nm, having a composition, as-synthesized and in the anhydrous state, in terms of mole ratios, as follows:

| | Broad | Exemplary |
|---|---|---|
| SiO$_2$/Al$_2$O$_3$ | 5 to 10 | 5 to 7 |
| M/SiO$_2$ | 0.01 to 0.20 | 0.01 to 0.20 | wherein M is potassium or a mixture of potassium and one or more other alkali metals.

DETAILED DESCRIPTION

Figure 1:
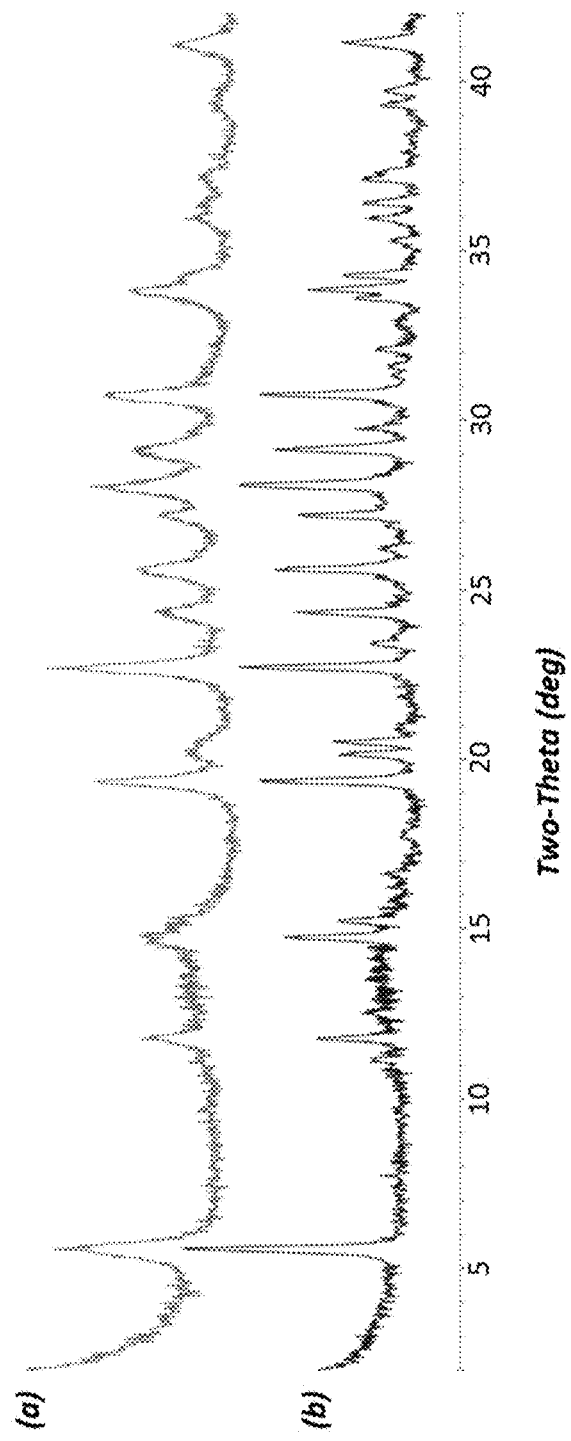
FIG. 1 shows a comparison of two powder X-ray diffraction (XRD) patterns: the top powder XRD pattern (a) is of the as-synthesized LTL framework type zeolite product of Example 1; and the bottom powder XRD pattern (b) is of a standard LTL framework type zeolite.

The following terms will be used throughout the specification and will have the following meanings unless otherwise indicated.

The term "zeolite" refers to crystalline aluminosilicate compositions which are microporous and which are formed from corner sharing $AlO_2$ and $SiO_2$ tetrahedra.

The term "framework type" is used in the sense described in the "*Atlas of Zeolite Framework Types*," Sixth Revised Edition, Elsevier (2007).

The term "alkali metal" refers to Group 1 metals of the Periodic Table, such as sodium and potassium.

The term "hydrothermal" refers to reactions performed in the presence of water or steam at temperatures above 100° C. and at pressures above atmospheric pressures (i.e., above about 100 kPa).

Reaction Mixture

In general, LTL framework type zeolites are prepared by: (a) preparing a reaction mixture containing (1) a FAU framework type zeolite; (2) hydroxide ions; (3) a source of an alkali metal; and (4) water; and (b) subjecting the reaction mixture to crystallization conditions sufficient to form crystals of the LTL framework type zeolite.

The composition of the reaction mixture from which the LTL framework type zeolite is formed, in terms of molar ratios, is identified in Table 1 below:

TABLE 1

| Reactants | Broad | Exemplary |
|---|---|---|
| $SiO_2/Al_2O_3$ | 5 to 60 | 10 to 60 |
| $M/SiO_2$ | 0.15 to 0.50 | 0.15 to 0.40 |
| $OH/SiO_2$ | 0.15 to 0.50 | 0.15 to 0.40 |
| $H_2O/SiO_2$ | 3 to 12 | 5 to 10 | wherein M is potassium or a mixture of potassium and one or more other alkali metals.

The combination of a FAU framework type zeolite and a low $H_2O/SiO_2$ mole ratio in the reaction mixture can produce an LTL framework zeolite product having small crystal size with no preferred growth direction (i.e., spherical or cube-like in shape). If only the amount of water is reduced in the reaction mixture, the LTL product has reduced crystal size while maintaining a cylindrical morphology. If the FAU framework type zeolite precursor is employed at higher $H_2O/SiO_2$ ratios in the reaction mixture, it less likely that an LTL product can be made, if at all, in the absence of LTL seed crystals. Moreover, the crystal size of any LTL product is too large.

Zeolitic materials having the FAU framework structure type include faujasite, zeolite X (U.S. Pat. No. 2,882,442), and zeolite Y (U.S. Pat. No. 3,130,007). In one embodiment, the FAU framework structure type zeolite is a Y zeolite that has undergone secondary treatment such ultrastable Y (USY) (U.S. Pat. No. 3,449,070), dealuminated Y (U.S. Pat. Nos. 3,442,792 and 4,331,694), and silicon-substituted Y zeolite, e.g., LZ-210 (U.S. Pat. No. 4,678,765).

The FAU framework type zeolite can have a $SiO_2/Al_2O_3$ mole ratio of from 2 to 80 (e.g., from 2 to 60, from 2 to 30, from 5 to 80, from 5 to 60, from 5 to 30, from 5 to 15, from 10 to 80, from 10 to 60, from 10 to 30, from 30 to 80 or from 30 to 60). The FAU framework type zeolite can be predominantly in the ammonium, hydrogen, or sodium form.

The source of potassium is usually potassium hydroxide. Alternatively, one can use a source of a mixture of potassium and one or more other alkali metals, for example, sodium, rubidium or cesium. Usually no more than 30 mole % of potassium is replaced by one or more other alkali metals.

The reaction mixture can be seeded with crystals of the desired LTL framework type zeolite both to direct, and accelerate the crystallization, as well as to minimize the formation of any undesired crystalline phases. When used, seed crystals are added in an amount of from 0.5 to 5.0 wt. % of the weight of source for silicon used in the reaction mixture. In one embodiment, the LTL framework type zeolite is prepared in the absence of any added seed crystals.

The reaction mixture can be prepared either batch wise or continuously. Crystal size, morphology and crystallization time of the LTL framework type zeolite described herein can vary with the nature of the reaction mixture and the synthesis conditions.

Crystallization and Post-Synthesis Treatment

In practice, the LTL framework type zeolite is synthesized by: (a) preparing a reaction mixture as described herein above; and (b) subjecting the reaction mixture to crystallization conditions sufficient to form crystals of the LTL framework type zeolite.

The reaction mixture is maintained at an elevated temperature until the crystals of the LTL framework type zeolite are formed. The hydrothermal conversion is usually conducted under pressure, and usually in an autoclave so that the reaction mixture is subject to autogenous pressure, at a temperature of from 125° C. to 200° C. (e.g., from 135° C. to 200° C., from 135° C. to 180° C., from 150° C. to 200° C., or from 150° C. to 180° C.).

The reaction mixture can be subjected to mild stirring or agitation during the crystallization step. It will be understood by a skilled artisan that the LTL framework type zeolites described herein can contain impurities, such as amorphous materials, unit cells having framework topologies which do not coincide with the LTL framework type zeolite, and/or other impurities.

During the hydrothermal conversion step, the LTL framework type zeolite crystals can be allowed to nucleate spontaneously from the reaction mixture. Once the LTL framework type zeolite crystals have formed, the solid product is separated from the reaction mixture by standard mechanical separation techniques such as filtration. The crystals are water-washed and then dried to obtain the as-synthesized zeolite crystals. The drying step can be performed at atmospheric pressure or under vacuum.

The LTL framework type zeolite can subsequently be calcined in steam, air or inert gas at temperatures ranging from 200° C. to 800° C. for periods of time ranging from 1 to 48 hours, or more. Usually, it is desirable to remove the alkali metal cation (e.g., $K^+$) by ion exchange and replace it with hydrogen, ammonium, or any desired metal-ion.

Where the LTL framework type zeolite formed is an intermediate material, the target zeolite can be achieved using post-synthesis techniques to allow for the synthesis of a target material having a higher $SiO_2/Al_2O_3$ mole ratio from an intermediate material by acid leaching or other similar dealumination methods.

Characterization of the LTL Framework Type Zeolite

LTL framework type zeolites made by the process described have a composition, as-synthesized and in the anhydrous state, as described in Table 2 (in terms of mole ratios):

TABLE 2

| | Broad | Exemplary |
|---|---|---|
| $SiO_2/Al_2O_3$ | 5 to 10 | 5 to 7 |
| $M/SiO_2$ | 0.01 to 0.20 | 0.01 to 0.20 | wherein M is potassium or a mixture of potassium and one or more other alkali metals.

The LTL framework type synthesized according to the present disclosure will typically crystallize as polycrystalline aggregates. Each of a first, a second, and a third dimension of each aggregate can be 300 nm or less (e.g., 275 nm or less, 250 nm or less, from 100 to 300 nm, from 100 to 275 nm, from 100 to 250 nm, from 125 to 300 nm, from 125 to 275 nm, from 125 to 250 nm, from 150 to 300 nm, from 150 to 275 nm, from 150 to 250 nm, from 175 to 300 nm, from 175 to 275 nm, or from 175 to 250 nm). In one embodiment, the aggregates each comprise a plurality of crystallites, and each crystallite has an average crystallite size of 50 nm or less (e.g., 45 nm or less, 40 nm or less, 35 nm or less, 30 nm or less, from 10 to 50 nm, from 10 to 45 nm, from 10 to 40 nm, from 10 to 35 nm, from 10 to 30 nm, from 15 to 50 nm, from 15 to 45 nm, from 15 to 40 nm, from 15 to 35 nm, from 15 to 30 nm, from 20 to 50 nm, from 20 to 45 nm, from 20 to 40 nm, from 20 to 35 nm, or from 20 to 30 nm). The crystallites can be spherical or cube-like in shape, i.e., none of the three dimensions (a, b, or c-axis) shows specifically preferred crystal growth direction.

By "crystallite" is meant individual crystals as opposed to agglomerated or aggregated crystals which can be referred to as particles. As used herein, the term "crystallite size" refers to the longest dimension of the crystallite. Average crystallite size can be determined by scanning electron microscopy or by powder X-ray diffraction using the Scherrer equation.

The polycrystalline aggregates can be essentially spherical in shape. For example, at least 80%, e.g., at least 90%, e.g., at least 95%, of the aggregates can have an aspect ratio of from 0.7 to 1. Aspect ratio can be calculated by dividing the shortest cross-sectional dimension of an aggregate by the longest cross-sectional dimension of the aggregate, as observed by SEM.

The LTL framework type zeolites synthesized by the process described herein are characterized by their powder X-ray diffraction pattern. X-ray diffraction patterns representative of LTL framework type materials can be referenced in M. M. J. Treacy et al., "*Collection of Simulated XRD Powder Patterns for Zeolites*," Fifth Revised Edition, Elsevier, 2007. Minor variations in the diffraction pattern can result from variations in the mole ratios of the framework species of the particular sample due changes in lattice constants. In addition, sufficiently small crystals will affect the shape and intensity of peaks, leading to significant peak broadening. Calcination can also cause minor shifts in the X-ray diffraction pattern. Notwithstanding these minor perturbations, the basic crystal structure remains unchanged.

The powder XRD patterns presented herein were collected by standard techniques. The radiation was $CuK_\alpha$ radiation. The peak heights and the positions, as a function of $2\theta$, where $\theta$ is the Bragg angle, were read from the relative intensities of the peaks, and d, the interplanar distance corresponding to the recorded lines, can be calculated.

The zeolite crystals recovered from the reaction mixture can correspond to substantially pure LTL framework type zeolite crystals. Substantially pure LTL framework type zeolite crystals are defined herein as LTL framework type zeolite crystals that contain less than 10 wt. % (e.g., less than 5 wt. %, less than 2.5 wt. %, or no detectable amount) of another type of zeolite, such as zeolite Y, e.g., as determined by X-ray diffraction analysis methods.

Applications for the Zeolite

The LTL framework type zeolite disclosed herein be used as a catalyst base and can be used in combination with a catalytically active metal in a wide variety of catalytic reactions. It is especially suited to catalytic applications where a low acid site strength is advantageous, such as aromatization.

The catalytically active metal(s) can be, for example, a Group 8-10 metal, such as platinum or palladium. A particularly advantageous catalyst composition incorporates from 0.1 to 6.0 wt. % (e.g., from 0.1 to 1.5 wt. % or from 0.4 to 1.2 wt. %) of the catalytically active metal(s), based on the total weight of the composition.

It can also be useful to incorporate into the catalyst one or more materials substantially inert under the conditions in which the catalyst is to be employed to act as a binder. Such binders can also act to improve the resistance of the catalyst to temperature, pressure and attrition. When present, the relative proportions of the zeolite component and the binder component can vary widely, with the zeolite content ranging from 1 to 90 wt. %, and more usually, particularly when the composite is prepared in the form of beads, powders, or extrudates, in the range from 2 to 80 wt. % of the composite. In typical embodiments employing binder, the zeolite component can be at least 10 wt. % of the composite, e.g., at least 20 wt. % or at least 30 wt. %.

The LTL framework type zeolite disclosed herein can be used in a process for the conversion of a hydrocarbon feed in which the feed is contacted with a catalyst as described above under appropriate conditions to bring about the desired conversion. They can, for example, be useful in reactions involving aromatization and/or dehydrocyclization and/or isomerization and/or dehydrogenation reaction. They are particularly useful in a process for the dehydrocyclization and/or isomerization of aliphatic hydrocarbons in which the hydrocarbons are contacted at a temperature of from 370° C. to 600° C. (e.g., from 430° C. to 550° C.) with a catalyst comprising the LTL framework type zeolite disclosed herein and preferably incorporating at least one Group VIII metal having dehydrogenating activity, so as to convert at least part of the aliphatic hydrocarbons into aromatic hydrocarbons.

The aliphatic hydrocarbons can be straight or branched chain acyclic hydrocarbons, and particularly paraffins such as hexane, although mixtures of hydrocarbons can also be used, such as paraffin fractions containing a range of alkanes possibly with minor amounts of other hydrocarbons. Cycloaliphatic hydrocarbon such as methylcyclopentane can also be used. In one embodiment, the feed to a process for preparing aromatic hydrocarbons and particularly benzene comprises hexanes. The temperature of the catalytic reaction can be from 370° C. to 600° C. (e.g., from 430° C. to 550° C.) and preferably pressures in excess of atmospheric pressure (101 kPa) are used (e.g., up to 2000 kPa, or from 500 to 1000 kPa). Hydrogen is employed in the formation of aromatic hydrocarbons preferably with a hydrogen to feed ratio of less than 10.

EXAMPLES

The following illustrative examples are intended to be non-limiting.

Example 1

2.58 g of a 45% KOH solution and 4.74 g of deionized water were mixed together in a Teflon liner. Then, 2.50 g of a USY zeolite (CBV712®, Zeolyst International, $SiO_2$/$Al_2O_3$ mole ratio=12) was added to the solution slowly. The liner was then capped and placed within a Parr steel autoclave reactor. The autoclave was put in an oven and heated at 150° C. for 2 days. The solid products were recovered from the cooled reactor by centrifugation, washed with deionized water and dried at 95° C.

Figure 2:
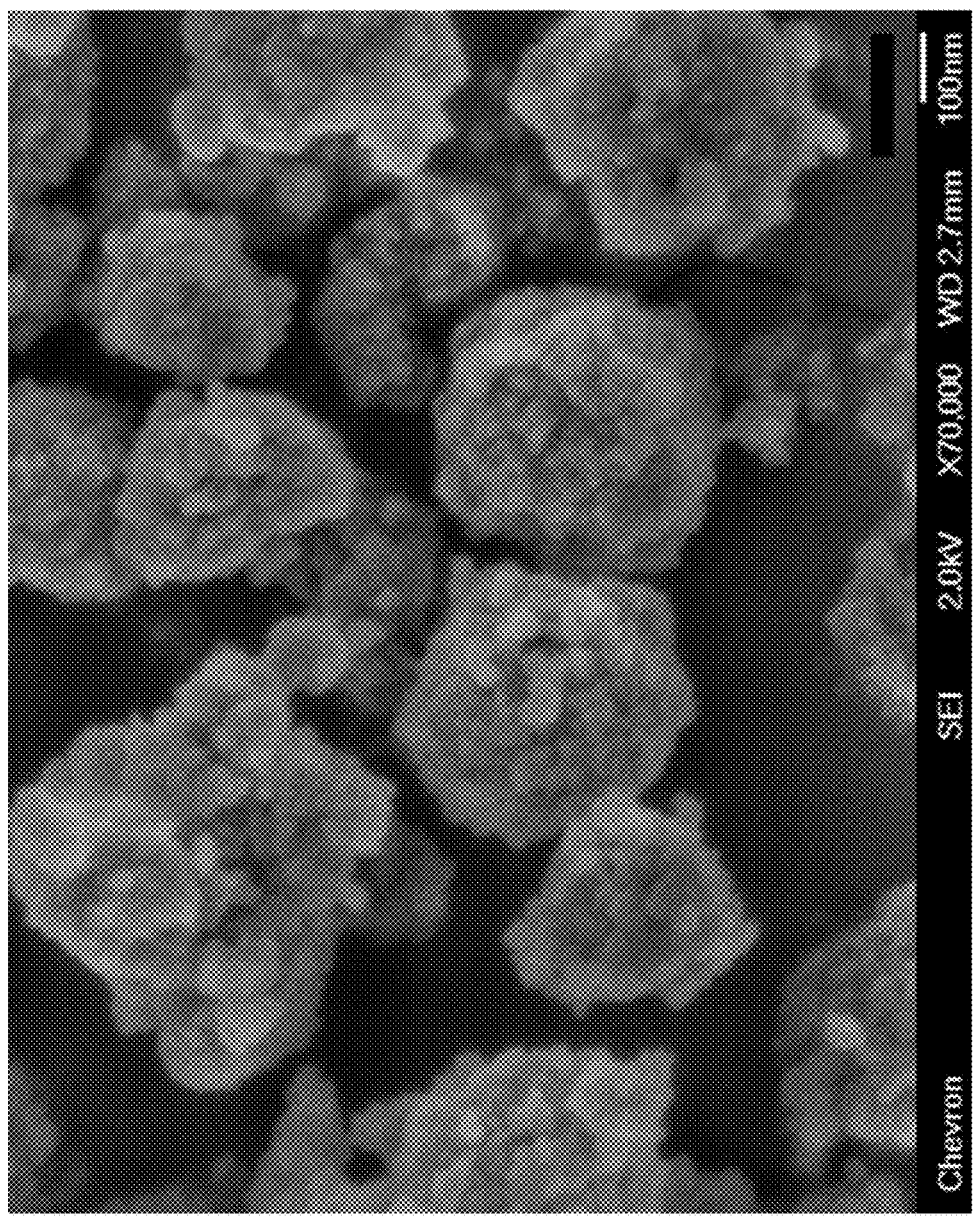
FIG. 2 shows a Scanning Electron Micrograph (SEM) of the as-synthesized zeolite prepared according to Example 1.

The resulting zeolite product was analyzed by powder XRD and SEM. The resulting powder XRD pattern, as shown in XRD pattern (a) of FIG. 1, identified the product of Example 1 as an LTL framework type zeolite. The powder XRD peaks for the as-synthesized LTL zeolite product of Example 1 shown in XRD pattern (a) of FIG. 1 are much broader than those shown in XRD pattern (b) of FIG. 1 for standard LTL zeolite. This indicates much smaller crystals were obtained from Example 1. Indeed, the average crystallite size was calculated to be 28.3 nm, using the Scherrer equation on powder XRD pattern (a) shown in FIG. 1. FIG. 2 is a scanning electron micrograph of the product of Example 1 and shows a uniform field of crystals. The crystalline aggregates were spherical particles about 200 nm in diameter. The individual crystallites within each aggregate had an average crystallite size of about 25 nm.

The product had a $SiO_2/Al_2O_3$ mole ratio of 6.14, as determined by ICP elemental analysis.

Example 2

1.06 g of a 45% KOH solution and 1.96 g of deionized water were mixed together in a Teflon liner. Then, 0.90 g of a USY zeolite (CBV720®, Zeolyst International, $SiO_2/Al_2O_3$ mole ratio=30) was added to the solution slowly. The liner was then capped and placed within a Parr steel autoclave reactor. The autoclave was put in an oven and heated at 135° C. for 3 days. The solid products were recovered from the cooled reactor by centrifugation, washed with deionized water and dried at 95° C.

The product of this preparation was identified by powder XRD analysis as an LTL framework type zeolite. SEM images indicated a uniform field of crystals having a similar morphology and size as described in Example 1.

The product had a $SiO_2/Al_2O_3$ mole ratio of 6.56, as determined by ICP elemental analysis.

Example 3

0.92 g of a 45% KOH solution and 1.72 g of deionized water were mixed together in a Teflon liner. Then, 0.90 g of a USY zeolite (CBV712®, Zeolyst International, $SiO_2/Al_2O_3$ mole ratio=12) was added to the solution slowly. The liner was then capped and placed within a Parr steel autoclave reactor. The autoclave was put in an oven and heated at 135° C. for 3 days. The solid products were recovered from the cooled reactor by centrifugation, washed with deionized water and dried at 95° C.

The product of this preparation was identified by powder XRD analysis as an LTL framework type zeolite. SEM images indicated a uniform field of crystals having a similar morphology and size as described in Example 1.

The product had a $SiO_2/Al_2O_3$ mole ratio of 6.25, as determined by ICP elemental analysis.

Example 4

2.17 g of a 45% KOH solution and 4.03 g of deionized water were mixed together in a Teflon liner. Then, 1.81 g of a USY zeolite (CBV760®, Zeolyst International, $SiO_2/Al_2O_3$ mole ratio=60) was added to the solution slowly. The liner was then capped and placed within a Parr steel autoclave reactor. The autoclave was put in an oven and heated at 125° C. for 5 days. The solid products were recovered from the cooled reactor by centrifugation, washed with deionized water and dried at 95° C.

The product of this preparation was identified by powder XRD analysis as an LTL framework type zeolite. SEM images indicated a uniform field of crystals having a morphology and size similar as described in Example 1.

The product had a $SiO_2/Al_2O_3$ mole ratio of 6.81, as determined by ICP elemental analysis.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained. It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items. As used herein, the term "comprising" means including elements or steps that are identified following that term, but any such elements or steps are not exhaustive, and an embodiment can include other elements or steps.

Unless otherwise specified, the recitation of a genus of elements, materials or other components, from which an individual component or mixture of components can be selected, is intended to include all possible sub-generic combinations of the listed components and mixtures thereof.

The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. To an extent not inconsistent herewith, all citations referred to herein are hereby incorporated by reference.

The invention claimed is:

1. A method for preparing an LTL framework type zeolite, characterized as polycrystalline aggregates, each of the aggregates comprising a plurality of spherical or cube-like crystallites and wherein each crystallite has an average crystallite size of from 10 to 50 nm, the method comprising:
 (a) preparing a reaction mixture comprising:
  (1) a FAU framework type zeolite;
  (2) hydroxide ions;
  (3) a source of alkali metal (M); and
  (4) water;
 wherein the reaction mixture comprises, in terms of mole ratios, the following:

| | |
|---|---|
| $SiO_2/Al_2O_3$ | 5 to 60 |
| $M/SiO_2$ | 0.15 to 0.50 |
| $OH/SiO_2$ | 0.15 to 0.50 |
| $H_2O/SiO_2$ | 3 to 12 | where M is potassium or a mixture of potassium and one or more other alkali metals; and
 (b) subjecting the reaction mixture to crystallization conditions sufficient to form crystals of the LTL framework type zeolite.

2. The method of claim 1, wherein each of the aggregates has a first, a second, and a third dimension, and each of the first, the second, and the third dimensions is from 100 to 300 nm.

3. The method of claim 1, wherein the aggregates are essentially spherical in shape.

4. The method of claim 1, wherein at least 80% of the aggregates have an aspect ratio of from 0.7 to 1.

5. The method of claim 1, wherein the FAU framework type zeolite is zeolite Y.

6. The method of claim 1, wherein the reaction mixture comprises, in terms of mole ratios, the following:

| | |
|---|---|
| $SiO_2/Al_2O_3$ | 10 to 60 |
| $M/SiO_2$ | 0.15 to 0.40 |
| $OH/SiO_2$ | 0.15 to 0.40 |
| $H_2O/SiO_2$ | 5 to 10. |

7. The method of claim 1, wherein the hydrothermal conditions include a temperature of from 135° C. to 200° C.

8. The method of claim 1, wherein the LTL framework type zeolite is prepared in the absence of LTL framework type seed crystals.

9. An LTL framework type zeolite, characterized as polycrystalline aggregates, each of the aggregates comprising a plurality of spherical or cube-like crystallites and wherein each crystallite has an average crystallite size of from 10 to 50 nm.

10. The zeolite of claim 9, wherein each crystallite has an average crystallite size of from 15 to 35 nm.

11. The zeolite of claim 9, wherein each of the aggregates has a first, a second, and a third dimension, and each of the first, the second, and the third dimensions is from 100 to 300 nm.

12. The zeolite of claim 9, wherein each of the aggregates has a first, a second, and a third dimension, and each of the first, the second, and the third dimensions is from 150 to 250 nm.

13. The zeolite of claim 9, wherein the aggregates are essentially spherical in shape.

14. The zeolite of claim 9, wherein at least 80% of the aggregates have an aspect ratio of from 0.7 to 1.

15. The zeolite of claim 9, wherein at least 95% of the aggregates have an aspect ratio of from 0.7 to 1.

* * * * *